(Model.)
L. J. BAILEY & L. H. THOMPSON.
Snap Hook and Rope Clasp.
No. 231,751. Patented Aug. 31, 1880.
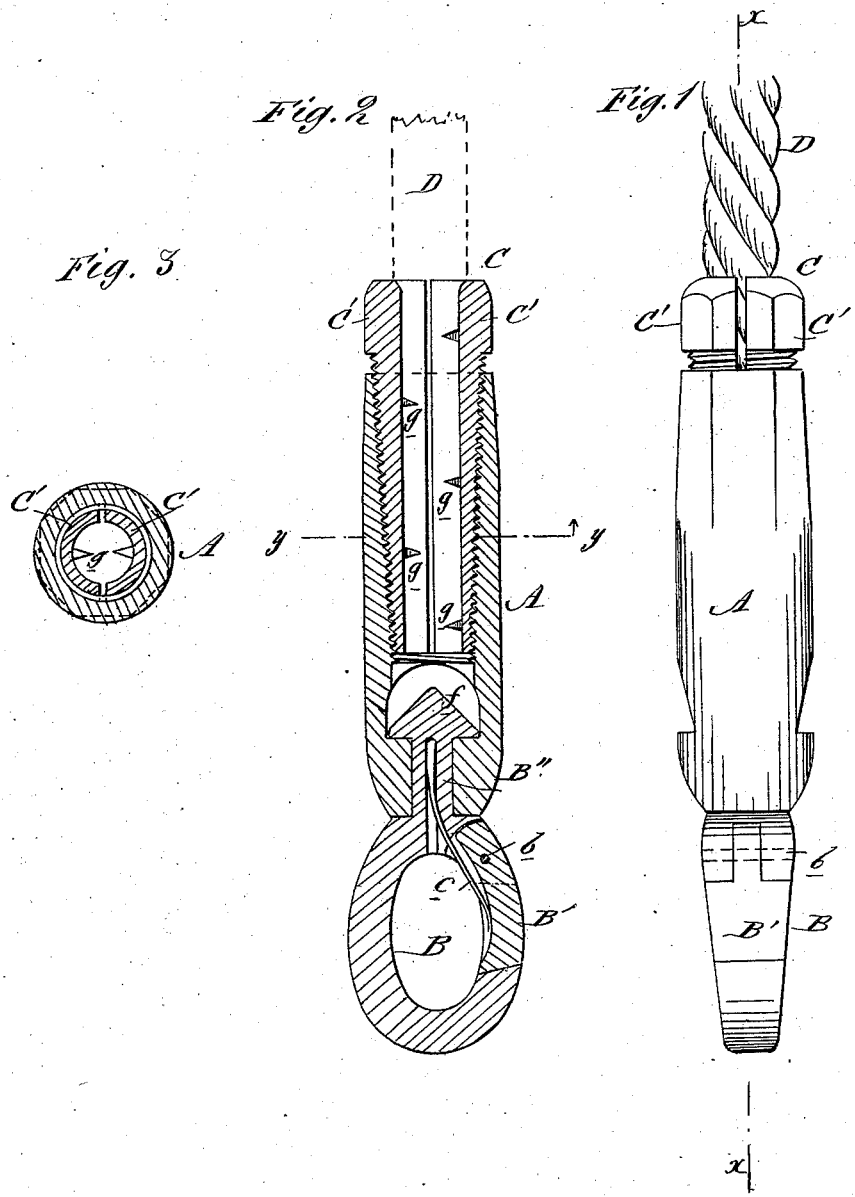
WITNESSES:
INVENTOR:
L. J. Bailey
L. H. Thompson
BY
ATTORNEYS.

UNITED STATES PATENT OFFICE.

LESTER J. BAILEY AND LEANDER H. THOMPSON, OF McPHERSON, KANSAS.

SNAP-HOOK AND ROPE-CLASP.

SPECIFICATION forming part of Letters Patent No. 231,751, dated August 31, 1880.

Application filed July 14, 1880. (Model.)

*To all whom it may concern:*

Be it known that we, LESTER J. BAILEY and LEANDER H. THOMPSON, of McPherson, in the county of McPherson and State of Kansas, have invented a new and Improved Snap-Hook and Rope-Clasp, of which the following is a specification.

The object of this invention is to provide a simple and convenient device for holding and fastening the end of a rope.

The invention consists of a snap-hook having a swiveled hook or loop and a tubular internally-threaded shank, into which is screwed a tapering clamping-sleeve that is constructed in longitudinal sections and is provided with interior projecting points.

Figure 1 is an elevation of the device with connected rope. Fig. 2 is a vertical sectional elevation of the same on line $x\ x$, Fig. 1. Fig. 3 is a cross-section of the same on line $y\ y$, Fig. 2.

Similar letters of reference indicate corresponding parts.

In the drawings, A represents the hollow internally-threaded shank of the device.

B is the swiveled hook or loop, provided with tongue B′, hinged at $b$, and actuated by a spring, $c$, that has one end entered into the shank B″ of said hook or loop B, while the other end of said spring $c$ bears against the inner face of said tongue B′ and presses it outward and in closed position.

The shank B″ of the hook or loop B is entered longitudinally through the end of the shank A of the device, and has its end hammered or headed up, as shown at $f$, so that said loop or hook B is swiveled in the end of said shank A.

C is an exteriorly-threaded tapering clamping-sleeve, made in two longitudinal sections, C′ C′, each section being provided internally with inward-projecting sharp points or studs $g\ g$, that are designed for the better holding of the rope D.

In order to secure this device upon a rope the end of the rope is clasped between the sections C′ C′ of the sleeve C, and the smaller end of said sleeve C is then entered into the open end of the shank A of the device and screwed in as tightly as may be desired, and the sections C′ C′ being thereby compressed upon the rope D, the points or studs $g\ g$ are forced into said rope D, which is thereby firmly held.

With this simple device the end of a rope is firmly held without tying, and can readily be attached or connected with any object.

Having thus fully described our invention, we claim as new and desire to secure by Letters Patent—

1. As an improved article of manufacture, a snap-hook and rope-clamp constructed substantially as herein shown and described, consisting of the hollow threaded shank A, swiveled hook or loop B, and threaded sectional sleeve C, as set forth.

2. The combination, with the hollow threaded shank A of a snap-hook, of the sectional screw-sleeve C, provided with interior points or studs, $g\ g$, substantially as herein shown and described.

LESTER JAMES BAILEY.
LEANDER HARRISON THOMPSON.

Witnesses:
H. BOWKER,
JOHN W. HILL,
M. P. SIMPSON.